United States Patent
Kuo

(10) Patent No.: US 7,703,731 B1
(45) Date of Patent: Apr. 27, 2010

(54) CLAMPING APPARATUS OF WEB CAMERA

(75) Inventor: Da-Yong Kuo, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/289,928

(22) Filed: Nov. 7, 2008

(51) Int. Cl.
*G09F 7/18* (2006.01)
*A47G 29/00* (2006.01)

(52) U.S. Cl. .............. 248/229.22; 248/231.41; 248/918; 248/126; 348/373

(58) Field of Classification Search ............ 248/229.22, 248/229.2, 229.12, 228.3, 230.3, 231.41, 248/918, 126, 346.01, 346.03; 348/373, 348/375; 396/428
See application file for complete search history.

(56) References Cited

U.S. PATENT DOCUMENTS

| | | | |
|---|---|---|---|
| 6,663,066 B1 * | 12/2003 | Hong | 248/231.41 |
| 6,679,463 B1 * | 1/2004 | Chen | 248/126 |
| 6,738,094 B1 * | 5/2004 | Minami et al. | 348/373 |
| 6,947,093 B2 * | 9/2005 | Yanakawa et al. | 348/373 |
| 7,093,811 B2 * | 8/2006 | Wu | 248/229.12 |
| 7,219,866 B2 * | 5/2007 | Depay et al. | 248/229.22 |
| 7,431,253 B2 * | 10/2008 | Yeh | 248/286.1 |
| D585,925 S * | 2/2009 | Kuo | D16/202 |
| 2006/0170817 A1 * | 8/2006 | Wu | 348/373 |

* cited by examiner

*Primary Examiner*—Anita M King
(74) *Attorney, Agent, or Firm*—Rosenberg, Klein & Lee

(57) ABSTRACT

A clamping apparatus of web camera includes a first clamping element, a second clamping element and at least one elastic element. The first clamping element has a base portion for engaging with a web camera. The base portion has a first clamping surface. A guide portion is extended from the first clamping surface. The second clamping element has a main portion which has a second clamping surface. The second clamping surface defines a recess for relatively slidably engaging with the guide portion and then adjusting the width of a clamping space defined by the first and second clamping surfaces. The elastic element is disposed between the first clamping element and the second clamping element for providing a clamping force between the first and second clamping surfaces.

6 Claims, 5 Drawing Sheets

CLAMPING APPARATUS OF WEB CAMERA

BACKGROUND OF THE INVENTION

1. Field of the Invention

The present invention relates to a clamping apparatus, and more particularly to a clamping apparatus of web camera.

2. The Related Art

A known clamping apparatus of web camera is disclosed to clamp a panel body for fixing a web camera onto the panel body. The clamping apparatus includes a first clamping arm, a second clamping arm, a connecting element and an elastic element. The first clamping arm is fixed to one side of the connecting element, and the second clamping arm is movably connected to the other side of the connecting element through the elastic element. An acute angle is formed between a free end of the first clamping arm and a free end of the second clamping arm for clamping the panel body therebetween. The elastic element enables the clamping apparatus to clamp different width panel bodies.

However, the above-mentioned clamping apparatus employs the free end of the first clamping arm and the free end of the second clamping arm to form an acute angle therebetween to clamp the panel body, the clamping manner is point-to-surface, the contact area is small and as a result, the clamping is unstable. Moreover, it is liable to scrape the surface of the panel body when clamping the panel body, especially when the panel body is the LCD panel of a notebook computer, so it will impact on the LCD panel.

SUMMARY OF THE INVENTION

An object of the present invention is to provide a clamping apparatus of web camera capable of firmly clamping a panel body to fix a web camera to the panel body. The clamping apparatus includes a first clamping element, a second clamping element and at least one elastic element. The first clamping element has a base portion for engaging with the web camera. The base portion has a first clamping surface. A guide portion is extended from the first clamping surface. The second clamping element has a main portion which has a second clamping surface. The second clamping surface defines a recess for relatively slidably engaging with the guide portion and then adjusting the width of a clamping space defined by the first and second clamping surfaces. The elastic element is disposed between the first clamping element and the second clamping element for providing a clamping force between the first and second clamping surfaces. So that the web camera can be fixed to the panel body by the first clamping surface and the second clamping surface firmly clamping the panel body therebetween.

As described above, the web camera is fixed to the panel body by the first clamping surface and the second clamping surface firmly clamping the panel body therebetween. The clamping manner is surface-to-surface, which increases the contact area between the panel body and the first and second clamping surfaces and then ensures the clamping effect more stable, and it will not scrape the surface appearance of the panel body.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
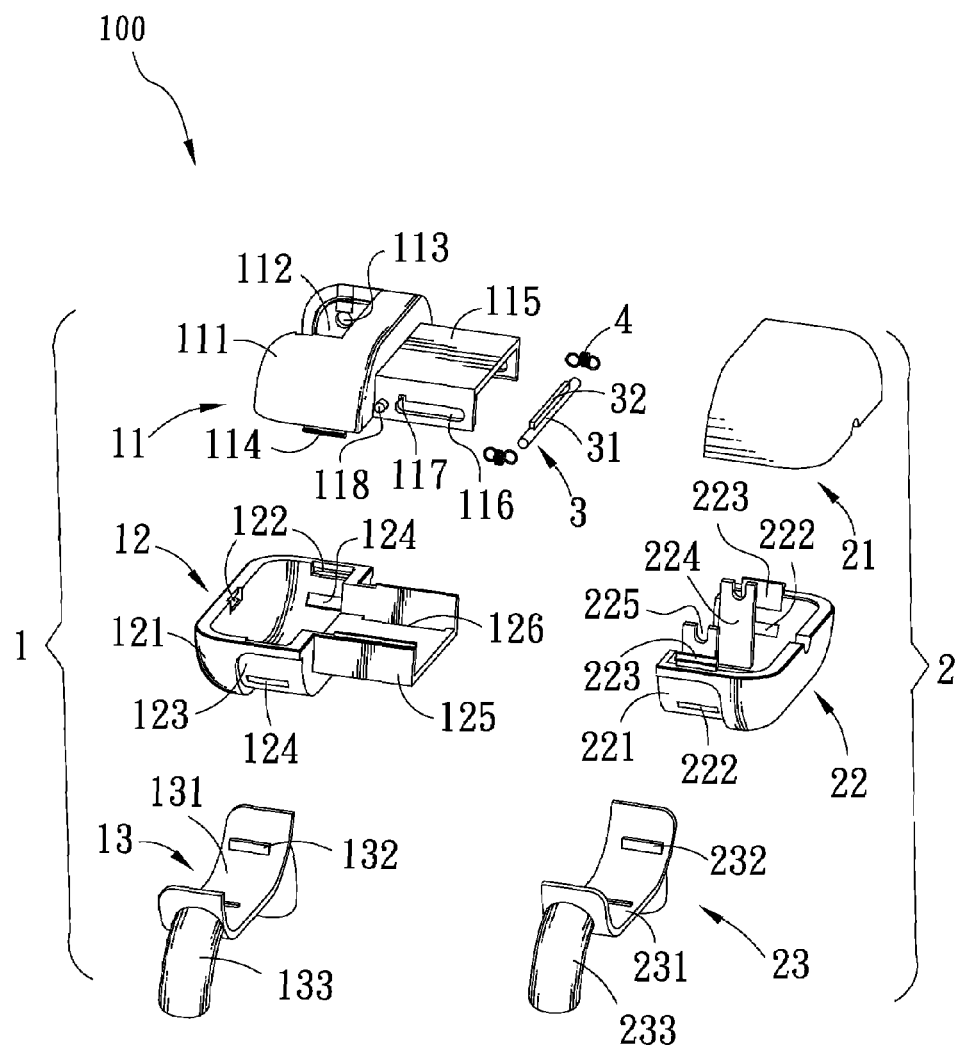
FIG. 1 is an exploded view of a clamping apparatus in accordance with the present invention.

With reference to FIG. 1, a clamping apparatus 100 according to the invention includes a first clamping element 1, a second clamping element 2, a sliding element. 3 and a pair of elastic elements 4.

Figure 2:
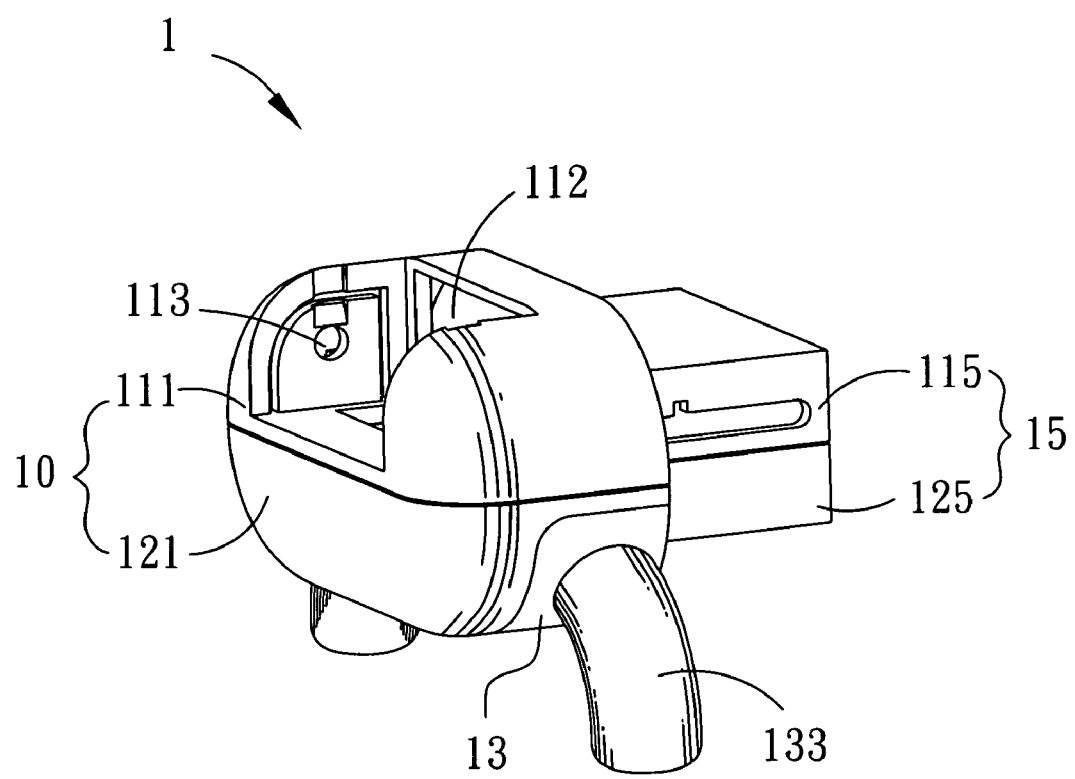
FIG. 2 is a perspective view of a first clamping element of the clamping apparatus.

Please refer to FIG. 1 and FIG. 2, The first clamping element 1 includes a first upper casing 11, a first lower casing 12 and a first holding frame 13. The first upper casing 11 has an upper head portion 111 which defines a receiving chamber 112 therein for receiving a web camera. Two opposing sides of the receiving chamber 112 respectively define a pivotal hole 113 for pivotally engaging the web camera and allowing the web camera to rotate through 180 degrees. The upper head portion 111 defines plural first hooking lumps 114 projecting downwardly. An upper tail portion 115 perpendicularly extends from a rear surface of the upper head portion 111. Two opposite sides of the upper tail portion 115 respectively define a sliding slot 116 extending horizontally and a location pole 118 located between the sliding slot 116 and the rear surface of the upper head portion 111. Each sliding slot 116 has an inserting gap 117 extending upward from an end thereof which is adjacent to the location pole 118.

Figure 4:
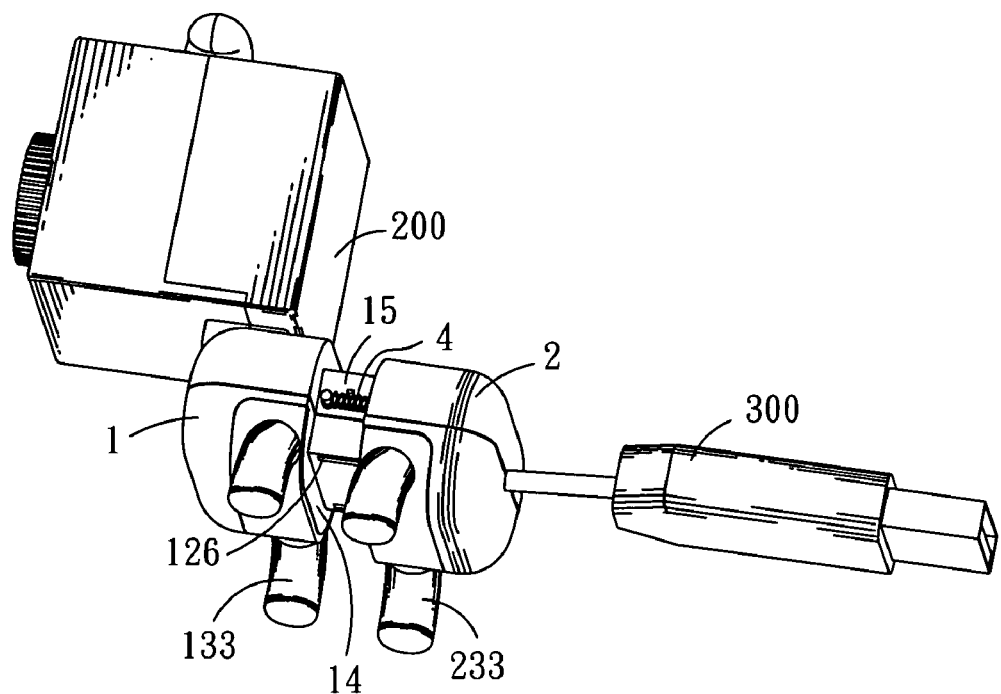
FIG. 4 shows that the clamping apparatus holds a web camera and elastic elements of the clamping apparatus are in an expanded state for clamping an object to fix the web camera.

The first lower casing 12 has a lower head portion 121 which defines plural first locking cavities 122 for correspondingly engaging with the first hooking lumps 114 of the first upper casing 11. A first engaging trough 123 is defined around the outer periphery of a bottom of the lower head portion 121. The first engaging trough 123 defines two first fixing holes 124 penetrating through the lower head portion 121. A lower tail portion 125 perpendicularly extends from a rear surface of the lower head portion 121. Two guiding slots 126 (as best shown in FIG. 4) are defined through a bottom side of the lower tail portion 125 and adjacent to two opposite sides of the lower tail portion 125 respectively. The lengths of the guiding slots 126 are substantially equal to the lengths of the sliding slots 116, and they are suitable for avoiding damaging the elastic potential energy of the elastic elements 4.

The first hooking lumps 114 are engaged with the first locking cavities 122 at one-to-one correspondence to assemble the first upper casing 11 with the first lower casing 12 together. In this case, the upper head portion 111 and the lower head portion 121 are connected together to form a base portion 10, the rear surface of the upper head portion 111 and the rear surface of the lower head portion 121 corporately define a first clamping surface 14 (labeled in FIG. 4), the upper tail portion 115 and the lower tail portion 125 are coupled with each other to form a guide portion 15.

The first holding frame 13 has a first holding base 131 showing an arc shape for matching the first engaging trough 123 of the first lower casing 12. The first holding base 131 defines two first fixed lumps 132 for correspondingly being buckled into the first fixing holes 124 to fix the first holding frame 13 to the first lower casing 12. The first holding base 131 further defines two first clamping legs 133 apart extending downward from the outside surface thereof, and inner sides of the first clamping legs 133 are disposed at the same plane as the first clamping surface 14 after the first holding frame 13 is assembled to the first lower case 12.

Figure 3:
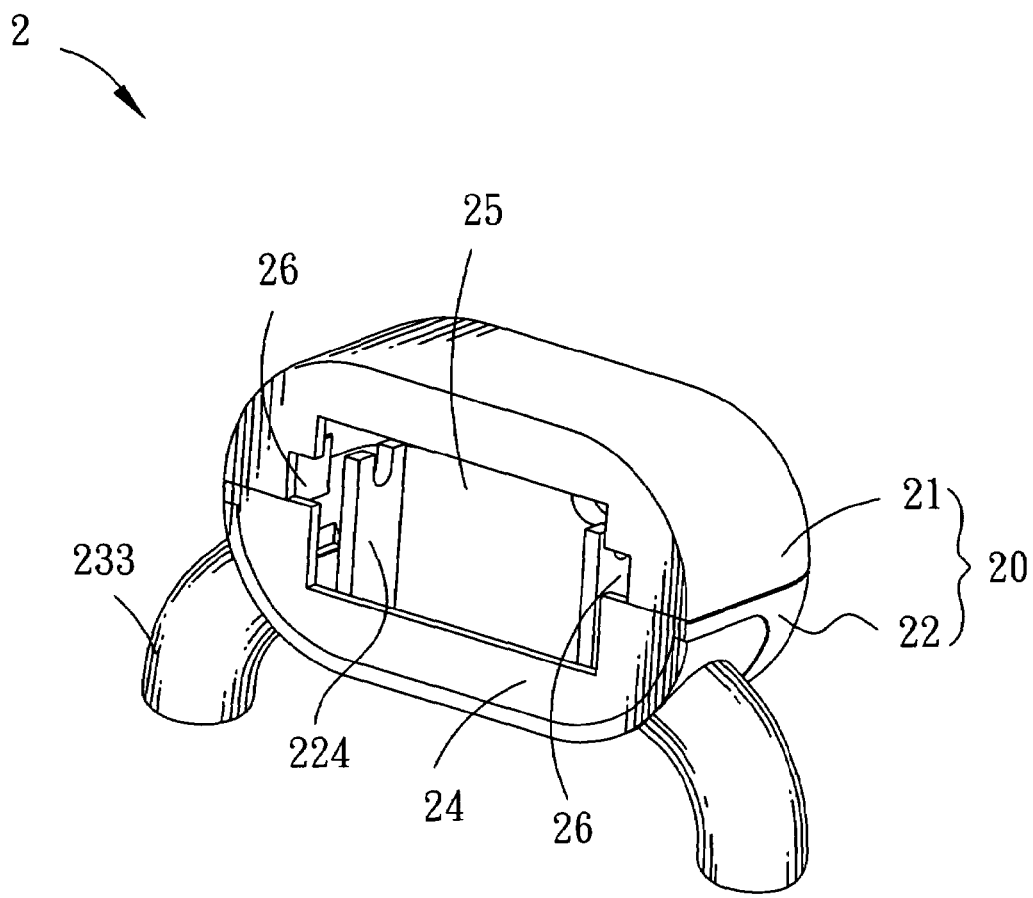
FIG. 3 is a perspective view of a second clamping element of the clamping apparatus.

Please refer to FIG. 1 and FIG. 3, similar to the first clamping element 1, the second clamping element 2 includes a second upper casing 21, a second lower casing 22 and a second holding frame 23. The second upper casing 21 and the second lower casing 22 can be assembled together, like the first upper casing 11 and the first lower casing 12, through the cooperation of second locking cavities (not shown) defined in the second upper casing 21 and the second hooking lumps 223 projected out of the second lower casing 22 to form a main portion 20. And therefore, a second clamping surface 24 is formed at the main portion 20 after the second upper casing 21 is assembled with the second lower casing 22. The second clamping surface 24 defines a recess 25 for relatively slidably engaging with the guide portion 15 and then adjusting the width of a clamping space defined by the first clamping surface 14 and the second clamping surface 24. Two opposite sides of the recess 25 respectively extend sideward to form an eschewing opening 26 for allowing the location pole 118 of the first clamping element 1 to pass therethrough.

Equivalent to the first lower casing 12, the second lower casing 22 has a second engaging trough 221 and two second fixing holes 222. The second lower casing 22 further defines two parallel supporting boards 224 extending upward and projecting out of the second lower casing 22. The distance between the two supporting boards 224 is substantially equal to the distance between the two guiding slots 126 of the first lower casing 12. Each supporting board 224 defines a supporting hole 225 penetrating through a top end thereof.

The second holding frame 23 is the same as the first holding frame 13, having a second holding base 231, two second fixed lumps 232 and two second clamping legs 233. The second holding base 231 is engaged with the second engaging trough 221 and the second fixed lumps 232 are buckled into the corresponding second fixing holes 222 to fix the second holding frame 23 to the second lower casing 22. Inner sides of the second clamping legs 233 are also disposed at the same level as the second clamping surface 24 after the second holding frame 23 is assembled to the second lower casing 22.

The sliding element 3 has a sliding rod 31 and a limitative bar 32 adhered to the sliding rod 31. The limitative bar 32 is shorter than the sliding rod 31 and the length of the limitative bar 32 is slightly smaller than or substantially equal to the distance between the two supporting boards 224. In this embodiment, the elastic elements 4 are drawsprings.

In assembly, the supporting boards 224 project through the guiding slots 126 and are properly adjusted along the guiding slots 126 to make the lower tail portion 125 located in the second lower casing 22 and the first lower casing 12 smoothly connected with the second lower casing 22. Then the first upper casing 11 is assembled to the first lower casing 12. In this case, the supporting boards 224 are received in the guide portion 15 and the supporting holes 225 are aligned with the inserting gaps 117. The sliding element 3 is inserted into one inserting gap 117 to mount the sliding rod 31 on the supporting holes 225 and meanwhile, two free ends of the sliding rod 31 are exposed outside through the sliding slots 116. Rotate the sliding rod 31 to make the limitative bar 32 positioned between the two supporting boards 224 for limiting the movement of the sliding element 3, so the sliding element 3 will not easily slip out of the upper tail portion 115. The elastic elements 4 are disposed between the first clamping element 1 and the second clamping element 2 with one end tied to the location pole 118 and the other end fastened to one free end of the sliding rod 31. Next, the second upper casing 21 is coupled with the second lower casing 22 to receive the upper tail portion 115 therein and smoothly contact the first upper casing 11. Finally, the first holding frame 13 and the second holding frame 23 are separately fixed to the corresponding first lower casing 12 and the second lower casing 22. Thus, the clamping apparatus 100 is completely assembled.

Refer to FIG. 4, which shows an example of the clamping apparatus 100 adapted for fixing a web camera 200 to a panel body (not shown), in general use, the panel body is often the LCD panel of a notebook computer. The web camera 200 which has a USB plug 300 electrically connected therewith is pivotally engaged to the first clamping element 1 and can rotate to any orientation for the convenience of capturing images. When the clamping apparatus 100 is used to fix the web camera 200 to the panel body, the second clamping element 2 is pulled to be removed from the first clamping element 1. The supporting boards 224 slide along the guiding slots 126 and pull the sliding element 3 to slip along the sliding slots 116. In this case, the guide portion 15 is exposed out of the second clamping element 2 through the recess 25, the elastic elements 4 pass through the eschewing openings 26 and are expanded for providing a clamping force between the first surface 14 and the second clamping surface 24. The first clamping element 1 and the second clamping element 2 will be drawn close to each other due to the elastic potential energy of the elastic elements 4. So the web camera 200 can be fixed to the panel body by the first clamping surface 14 and the second clamping surface 24 firmly clamping the panel body therebetween. Moreover, the first clamping legs 133 and the second clamping legs 233 can help to strengthen the clamping effect of the clamping apparatus 100.

Figure 5:
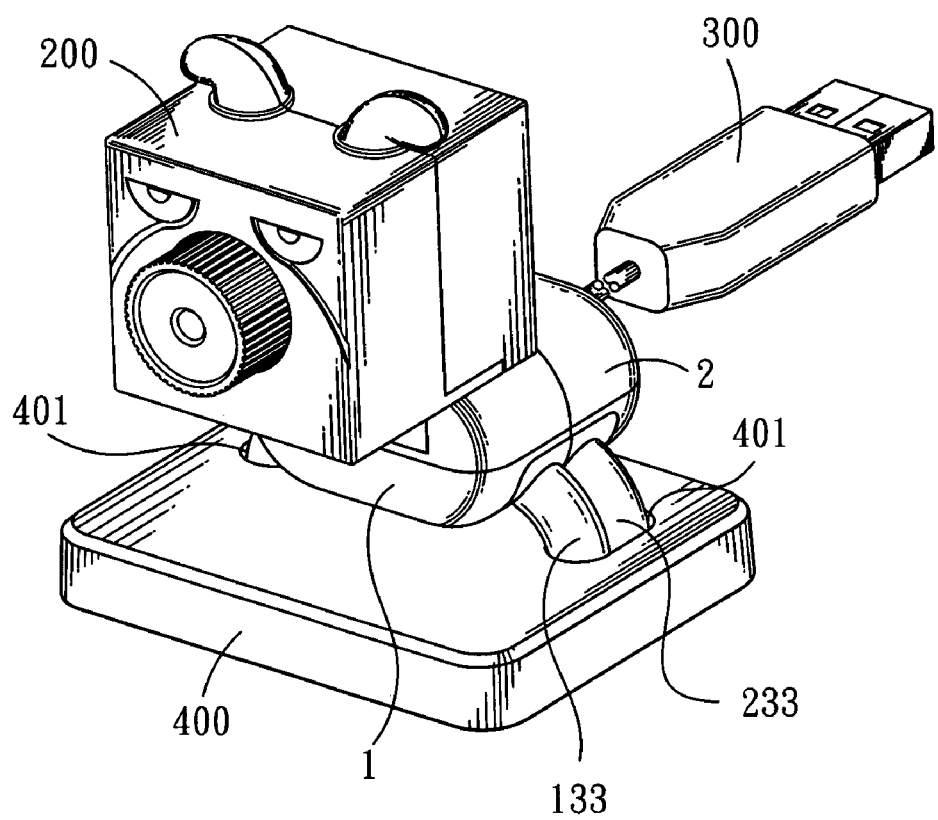
FIG. 5 shows the clamping apparatus holding a web camera, where the clamping apparatus is fixed in a flat base for being placed on a plane surface.

Refer to FIG. 5, showing another example of the clamping apparatus 100 adapted for fixing the web camera 200 on a plane surface. A flat base 400 which defines two inserting holes 401 is provided. The first clamping legs 133 and the second clamping legs 233 are combined with each other to be embedded in the inserting holes 401. So the web camera 200 can be placed on a table or a desktop computer through the first and the second clamping legs 133, 233 inserted into the inserting hole 401 of the flat base 400.

As the above description, the web camera 200 can be placed on a plane surface by the first and the second clamping legs 133, 233 combined with each other and inserted into the inserting hole 401 of the flat base 400. Also, the web camera 200 can be fixed to a panel body by the first clamping surface 14 and the second clamping surface 24 firmly clamping the panel body. The clamping manner is surface-to-surface, which increases the contact area between the panel body and the first and second clamping surfaces 14, 24 and then ensures the clamping effect more stable, and it will not scrape the surface appearance of the panel body.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A clamping apparatus of a web camera, comprising:
a first clamping element having a base portion for engaging with the web camera, the base portion having a first clamping surface, a guide portion extended from the first clamping surface;
a second clamping element having a main portion, the main portion having a second clamping surface, the second clamping surface defining a recess for relatively slidably engaging with the guide portion and then adjusting the width of a clamping space defined by the first and second clamping surfaces; and
at least one elastic element disposed between the first clamping element and the second clamping element for providing a clamping force between the first and second clamping surfaces;
wherein the base portion of the first clamping element has at least one first clamping leg extending downward from a bottom thereof and an inner side of the first clamping leg is disposed at the same plane with the first clamping surface, the main portion of the second clamping element has at least one second clamping leg extending downward from a bottom thereof and an inner side of the second clamping leg is disposed at the same level with the second clamping surface.

2. The clamping apparatus of a web camera as claimed in claim 1, further comprising a flat base which defines at least one inserting hole, the first clamping leg and the second clamping leg being capable of combining together and embedded in the inserting hole for placing the web camera on a plane surface.

3. A clamping apparatus of a web camera, comprising:
a first clamping element having a base portion for engaging with the web camera, the base portion having a first clamping surface, a guide portion extended from the first clamping surface;
a second clamping element having a main portion, the main portion having a second clamping surface, the second clamping surface defining a recess for relatively slidably engaging with the guide portion and then adjusting the width of a clamping space defined by the first and second clamping surfaces; and
at least one elastic element disposed between the first clamping element and the second clamping element for providing a clamping force between the first and second clamping surfaces;
wherein two opposite sides of the guide portion respectively define a sliding slot and a location pole located between the sliding slot and the first clamping surface, a sliding element being placed on the sliding slots with two free ends thereof projecting outside from the sliding slots, one end of the elastic element being tied to one location pole and the other end being fastened to one free end of the sliding element, two opposing sides of the recess of the second clamping element respectively extending sideward to form an eschewing opening for allowing the location pole and the elastic element to pass therethrough.

4. The clamping apparatus of a web camera as claimed in claim 3, wherein a bottom side of the guide portion defines two guiding slots apart from each other, the main portion of the second clamping element having two supporting boards extending upwardly into the recess from a bottom thereof, the supporting boards correspondingly passing through the guiding slots and extending into the guiding portion and capable of sliding along the guide slots.

5. The clamping apparatus of a web camera as claimed in claim 4, wherein each sliding slot has an inserting gap extending upward from an end thereof which is adjacent to the location pole, each supporting board defining a supporting hole penetrating through a top end thereof for being in alignment with the inserting gaps, the sliding element having a sliding rod and a limitative bar shorter than the sliding rod connected with the sliding rod, the limitative bar inserted in the inserting gap to mount the sliding rod on the supporting holes, then supporting boards holding the sliding rod and pulling the sliding rod to slip along the sliding slots.

6. The clamping apparatus of a web camera as claimed in claim 4, wherein a limitative bar is jammed between the two supporting boards for limiting the movement of the sliding element by rotating a sliding rod after the sliding element is mounted on the supporting boards.

* * * * *